April 7, 1936. J. E. WILKES Re. 19,918

RECEPTACLE CLEANING APPARATUS

Original Filed April 19, 1929 4 Sheets-Sheet 1

Inventor:
John E. Wilkes,
By Frank H. Borden
Attorney.

April 7, 1936. J. E. WILKES Re. 19,918

RECEPTACLE CLEANING APPARATUS

Original Filed April 19, 1929 4 Sheets-Sheet 2

Inventor:
John E. Wilkes,
By Frank H. Borden
Attorney.

April 7, 1936. J. E. WILKES Re. 19,918

RECEPTACLE CLEANING APPARATUS

Original Filed April 19, 1929 4 Sheets-Sheet 3

Inventor:
John E. Wilkes,
By Frank H. Borden
Attorney

RECEPTACLE CLEANING APPARATUS
Original Filed April 19, 1929 4 Sheets-Sheet 4
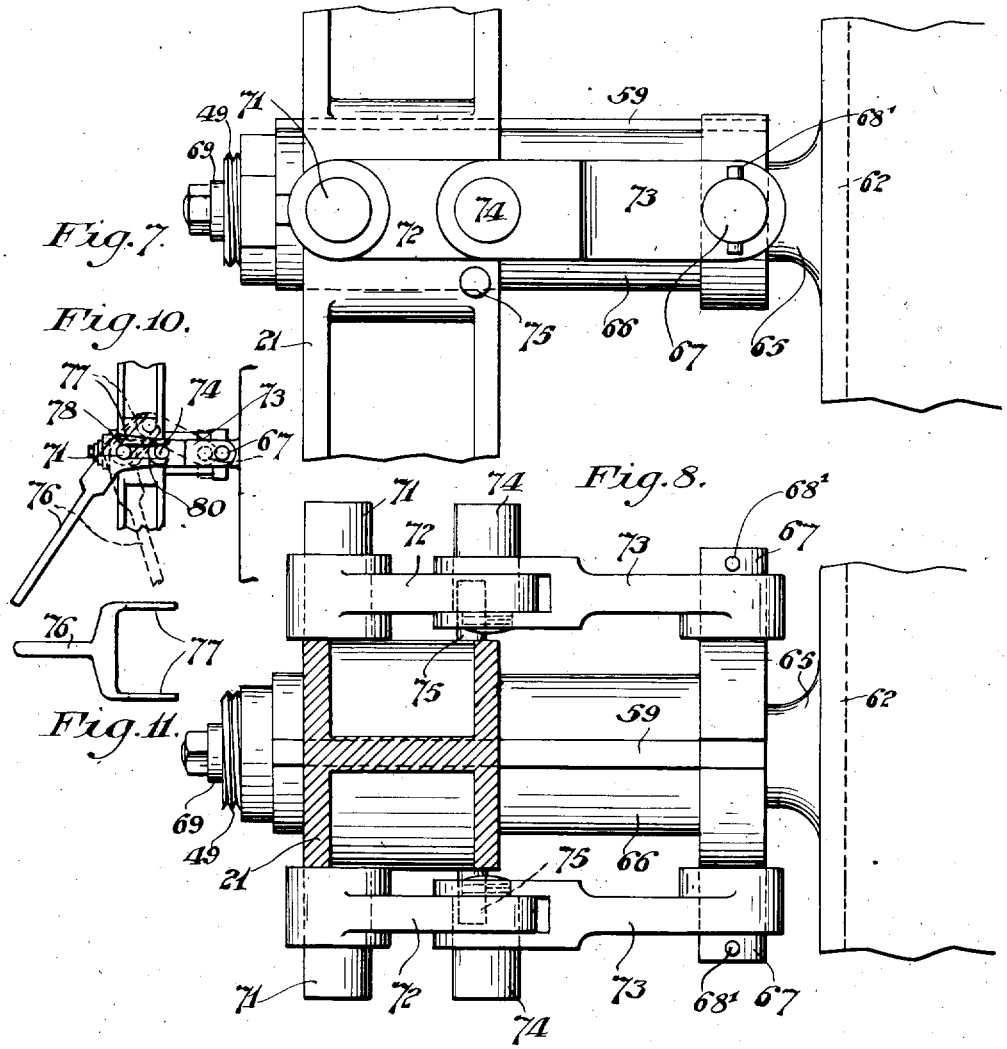
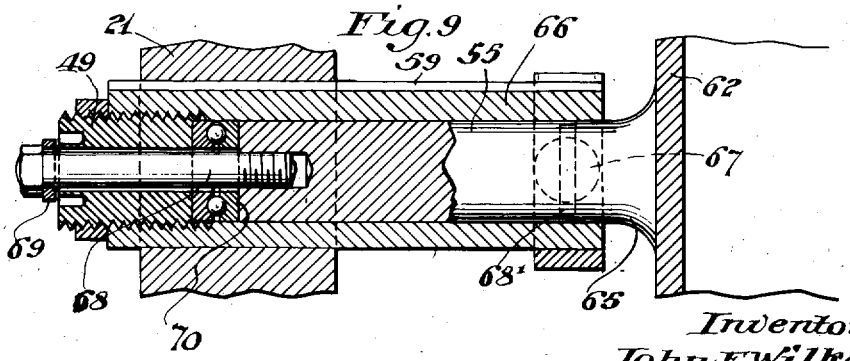
Inventor.
John E. Wilkes,
By Frank H. Borden
Attorney.

Reissued Apr. 7, 1936 Re. 19,918

UNITED STATES PATENT OFFICE 19,918

RECEPTACLE CLEANING APPARATUS

John E. Wilkes, Paulsboro, N. J.

Original No. 1,907,395, dated May 2, 1933, Serial No. 356,473, April 19, 1929. Application for reissue April 4, 1935, Serial No. 14,639

15 Claims. (Cl. 141—6)

This invention relates to apparatus for cleaning barrels or other receptacles.

Receptacles or containers, such as metallic barrels as used for the transportation of certain grades of oil, must be completely free from rust and scale. It has been discovered that such scale can be removed by causing frictional engagement between a metallic abrasive material, such for instance as a steel or brass chain, and the inner walls or surfaces of the container. Many attempts have been made heretofore to provide an apparatus so constructed as to facilitate such cleansing abrasion by agitation, but so far as known they have been without appreciable success.

Factors which must be accorded consideration in any proper solution of the problem include; the weight of the container to be treated; the fact that it must be susceptible of quick and easy insertion and removal from the apparatus; and the necessity that the relative motion of the container and the contained abrasive element be so pronounced as to cause the actual abrading cleansing stroke, without setting up destructive periodic vibrations such as will wrack the apparatus and prevent its proper functioning.

Among the objects of this invention are; to improve the construction of receptacle cleaning apparatus; to provide a receptacle cleaning apparatus in which containers to be treated may be expeditiously inserted and removed from the apparatus; to provide an apparatus in which a receptacle is supported and simultaneously given a horizontal reciprocation while being horizontally oscillated; to provide a receptacle cleaning apparatus of such construction that the inertia of the contained receptacle is utilized to establish a periodic, harmonic, reciprocation; to eliminate from barrel washing apparatus, dashpots, recoil checks and similar devices heretofore necessary in certain types of barrel washers; to provide in a receptacle during a reciprocating movement thereof, in various adjusted positions so as to facilitate during a reciprocating movement thereof, in various adjusted positions so as to facilitate contacting and cleansing abrasion upon all parts of the receptacle; to reduce the power formerly necessary to operate receptacle cleaning apparatus; to provide means for oscillating a receptacle in a substantially horizontal plane with a natural periodic, harmonic, oscillation, with power means geared to drive the mechanism at the natural periodic rate of speed thereof, and many other objects and advantages as will become more apparent as the description proceeds.

In carrying out the invention in the preferred form, arcuate runners or rockers are provided upon which a receptacle holding cradle is journaled at a point below the axis of the periphery of the runners, so that oscillation of the receptacle support upon the runners causes the receptacle support to rise toward the ends of its reciprocation, whereby the weight of the receptacle is utilized to damp and check the reciprocation towards the ends of its stroke and also whereby the weight of the receptacle causes the inception of a return reciprocation, and thus establishes a natural periodic pendulum action for the apparatus. Power means is provided which is so timed as to correspond with this natural periodic pendulum oscillation as to reduce the power needed to a minimum. Means are provided for varying the angular disposition of the receptacle with relation to the runners or rockers mechanically or under the manual control of the operator, and, preferably a step by step mechanism is provided by which the receptacle is caused to rotate about its longitudinal axis to present the entire area of the receptacle to the abrading action.

In the accompanying drawings forming part of the specification:

Figure 1:
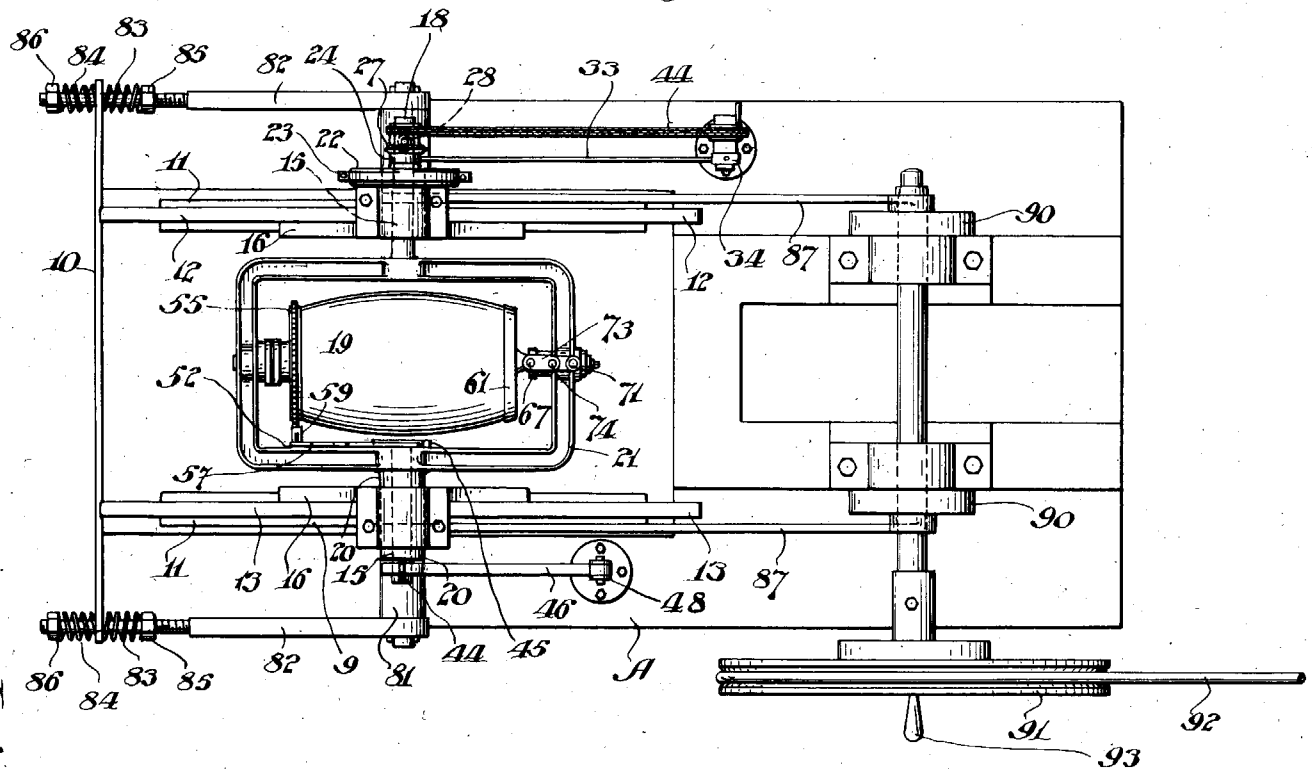
Fig. 1 represents a top plan of the assembled device.
Figures 2, 12:
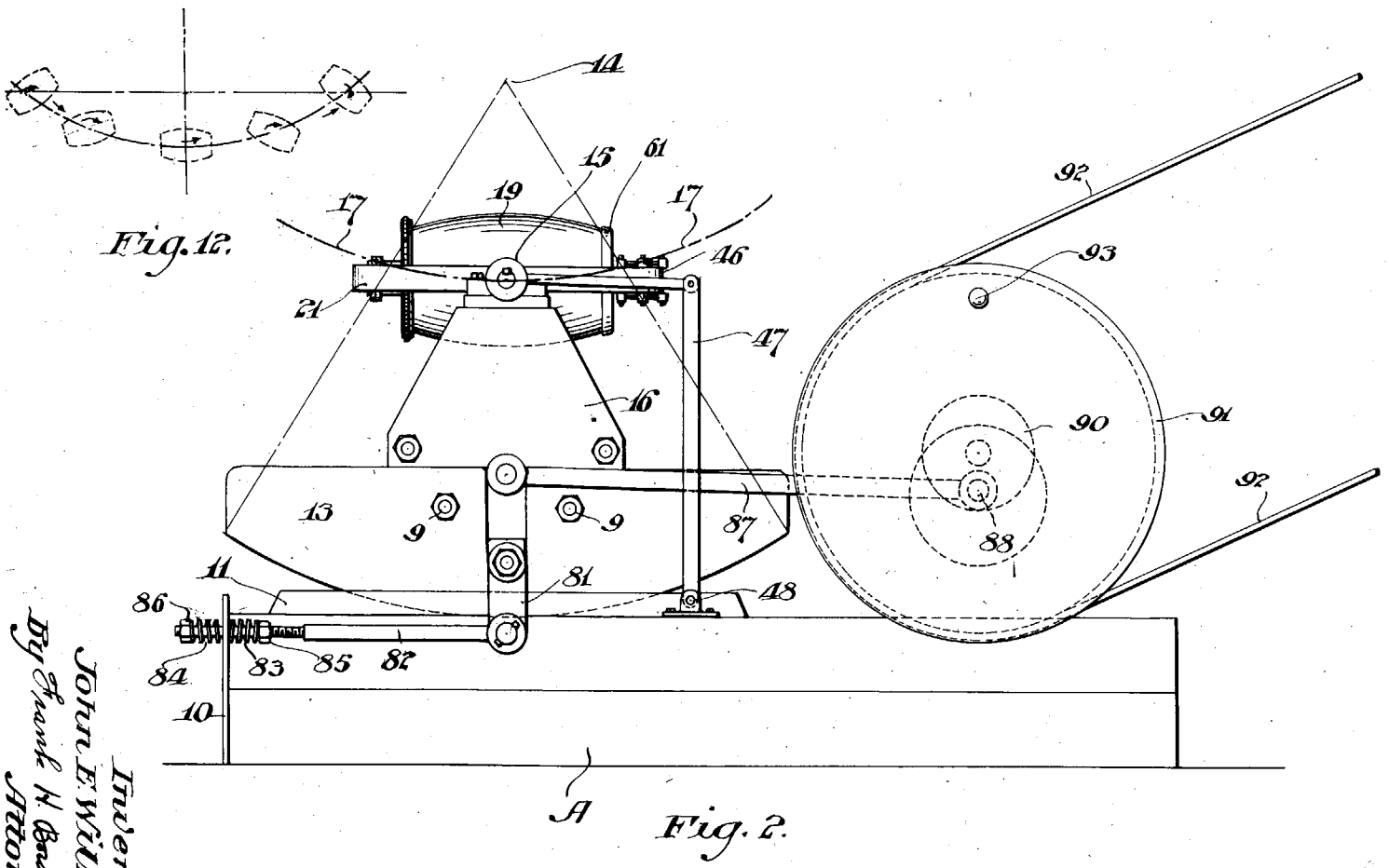
Fig. 2 represents an elevation of one side of the device.
Figure 3:
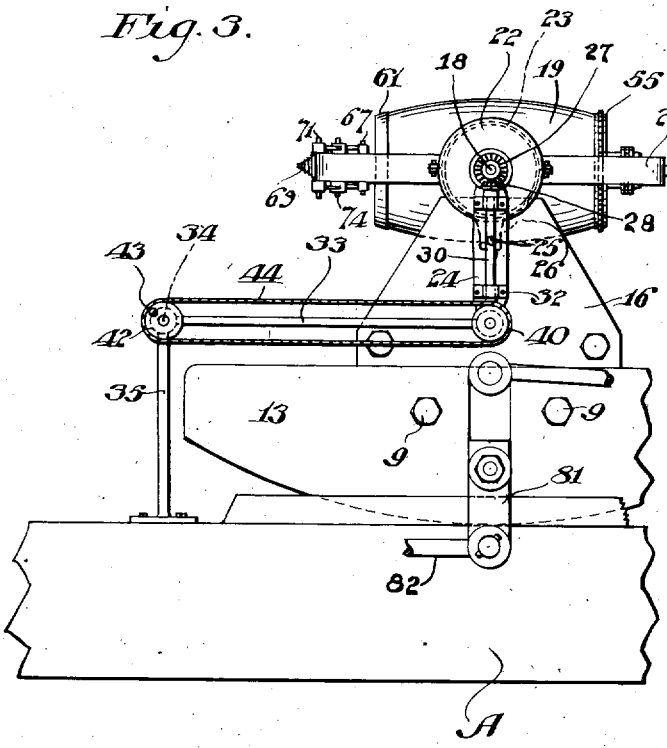
Figure 4:
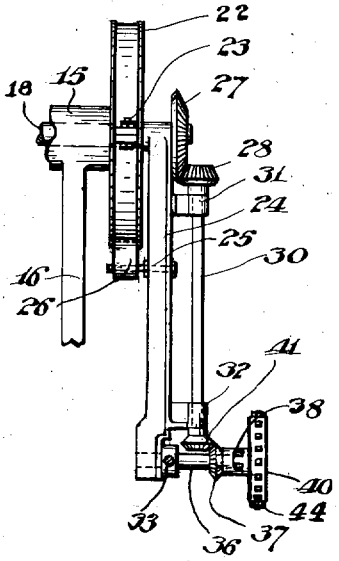
Figure 5:
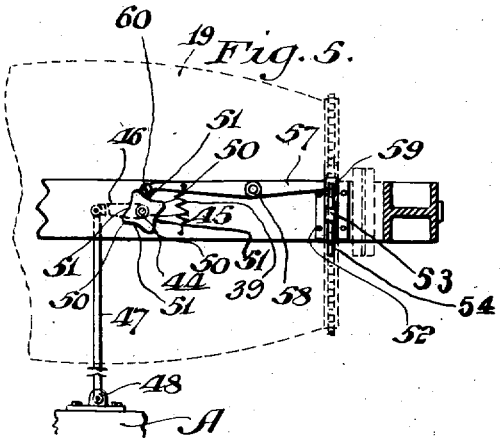
Figure 6:
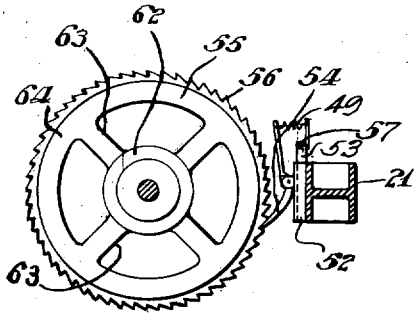

Fig. 3 represents an elevation of the other side of the device partially broken away, Fig. 4 represents a fragmentary end elevation partially broken away of the gearing, associated with one trunnion of the apparatus, Fig. 5 represents an elevation partially in section of the inner framework supporting the receptacle disclosing the step by step feed mechanism, Fig. 6 represents a vertical section through the frame-work disclosing the head clamping device and the step by step feed element, Fig. 7 represents a fragmentary top plan of the other head clamping elements disclosing the relationship of the toggle mechanism with the frame, Fig. 8 represents a vertical section through the frame with the toggle mechanism shown in elevation, Fig. 9 represents a fragmentary horizontal section through the toggle mechanism and framework, Fig. 10 represents a fragmentary detail showing the relationship of the detachable handle and the toggle assembly with the adjusted position thereof indicated by dotted lines, Fig. 11 represents a perspective view of the handle, and Fig. 12 represents a diagrammatic view of the progressive movements of the receptacle on a transverse diametric horizontal axis while being moved as a unit in an arcuate path.

A base A is provided having preferably an end plate 10 perpendicular to and extending laterally of a pair of rails or tracks 11 mounted upon the base. Seated in the grooves of the rails 11 are the arcuate runners or rockers 12 and 13 respectively. The axis of rotation of each of the arcuate runners is located at point 14 between which and the contacting arcuate surface of the runner are located bearings 15 rigidly mounted upon the respective side plates 16 which in turn are either integral with the respective runners 12 and 13 or may be made separate therefrom, but rigidly affixed to the runners as by bolts 9. It will be observed that, owing to the disposition of the bearings relative to the curved arcuate surfaces and the rockers, and relative to the axis of rotation thereof, movement of the entire framework so far described upon the rails in a rocking motion, causes the bearings to follow a path slightly arcuate and thus to move gently upwardly at the ends of the reciprocating stroke, as, to the points indicated at 17 in Fig. 2. Thus through substantially one half of the reciprocating stroke, the weight, supported and centered in the bearings will in effect be moving "down hill", while during the other half of the stroke substantially, the weight, centered in the bearings, will be moving upwardly against the influence of gravity, thus retarding, damping or slowing down the reciprocation.

It will be clear, with the structure so far described, that upon a rocking motion being transmitted to the apparatus, a pendulum action will ensue, causing the apparatus to rock back and forth upon the rails in a natural, periodic action. In the absence of power impulses, of course, the apparatus will gradually slow down under the influence of friction and other forms of resistance. It will be clear, that, with the natural periodic reciprocation thus established, a minimum of power will be required to cause this action to be continued and sustained through the natural periodic oscillation of the apparatus.

It has been found with a metal receptacle reciprocated substantially in a plane passing through its longitudinal axis, that the determination of the reciprocation must be quite abrupt in order to cause the contained abrasive element to longitudinally slide with a grinding stroke across the inner surface of the barrel, by its inertia. Unfortunately, as previously practiced such abrupt termination establishes such factors of vibration and shock as to wrack the entire apparatus and render it noisy and short lived.

In view of the natural, easy and gradual termination of each of the reciprocating strokes in a cradle arrangement as disclosed, it has been found advisable to enhance the natural tendency of the contained abrasive to slide sharply to the end of the barrel, or other receptacle, at the end of the reciprocation, by imparting in effect, a whip like action thereto. This has been accomplished by causing the receptacle or barrel to oscillate on an axis transverse to its path of reciprocation as it approaches each end of its reciprocating stroke so that, although the center of the barrel is more or less imperceptibly raised at the ends of the reciprocating stroke one end of the barrel is swung sharply down and the other end swung sharply up, to present an inclined surface to the abrasive element down which it may slide with certainty and with a maximum of cleaning efficiency. This desirable result is attained through the novel means to be described, and is an incident to and result of the continued reciprocating motion of the apparatus.

The bearings 15 provide bearings for the gudgeons 18 and 20 respectively, preferably integrally attached to a rectangular frame 21, in which the receptacle 19 is supported during the cleansing operation, as will be further described. Gudgeon 18 is preferably a solid shaft upon which friction drum 22 is keyed and with which the adjustable friction element or band 23 is engaged. The friction drum 22 is keyed to the shaft or gudgeon 18 so that the rectangular frame 21 and the friction drum rotate or oscillate together. Loosely journaled on the shaft 18 is a vertical link 24 having a laterally extending pin 25 engaging a yoke formed at the bottom of the adjustable friction element or band 23 as at 26 (Fig. 4). A beveled gear 27 is keyed or splined to the shaft 18 in mesh with a cooperating pinion gear 28 mounted upon the vertical shaft 30. The vertical shaft 30 is journaled in bearings formed in sides of link 24 as at 31 and 32. At its lower end the link 24 is pivotally connected to a horizontal link 33 pivotally connected in turn at 34 to a vertical post 35 rigidly mounted upon the base A. The lower end of the link 24 carries a transverse shaft 36 carrying a gear 37 loosely journaled on the shaft and connected to the lost motion connection or clutch 38 carrying a sprocket gear 40. Pinion 37 is in mesh with a cooperating pinion gear 41 keyed to the lower end of the vertical shaft 30. Post 35 carries a rotatable sprocket gear 42 having a handle 43 by which it may be turned and connected by the links of a chain 44 to the sprocket gear 40. At its end, link 33 is held pivotally by the post 35.

Reciprocation of the apparatus so far described upon its rockers or runners will cause the bearings (the center of gravity of the barrel) to travel forward and back on an arcuate path departing but little from a horizontal plane, and through the frictional engagement of the drum on shaft 18 with its cooperating clamping portion 23 engaged at the lower end by the pin 25 the rectangular frame will be oscillated in the bearings 15 and the barrel or receptacle will thus be inclined from the horizontal at each end of its reciprocating stroke. Obviously the extent of its inclination will be varied according to the distance of the pivoted connection between links 33 and 24 and the axis of the bearings. The lost motion connection between the sprocket gear 40 and the pinion gear 37 is adequate to remove any pressure on the gears incident to such oscillation. It being desirable to support the barrel in various positions relative the horizontal, such for instance as in a position wherein the head of the barrel is to be abraded the chain and sprocket gearing disclosed is arranged so that the rectangular frame may be moved to any desired position by turning sprocket 42 by means of its handle 43, without stopping the machine.

Although manual control of the device for adjusting the barrel or other receptacle is preferred, it is to be noted that other means of control are contemplated.

It has been attempted in the past to secure a cleansing or abrasive action by supporting a barrel in a framework which was continuously rotated about its axis, and in which the abrasive element tumbled. This was not satisfactory as the abrasive element had but an intermittent contact with the inner surface of the barrel, and the cleansing operation had to be continued for such a length of time as to be commercially impracticable in order to even approximately abrade the entire inner surface of the barrel. Such devices have also been accompanied by gearing, causing a continuous rotation of the barrel about its longitudinal axis which, while designed to expose the entire internal area of the barrel progressively to the tumbling abrasive element, simply increased the hit or miss action of the abrasive.

The invention, herein, contemplates a progressive step by step rotation of the barrel or other receptacle during its reciprocating actions and at the ends of a reciprocating stroke. The distance the barrel is rotated by progressive impulses, is preferably co-ordinated with the normal area of the abrading element within the barrel so that the entire area is abraded in the shortest possible time and with the least number of reciprocations.

In the preferred form of the mechanism for securing the step by step rotation of the barrel, a shaft 44 is journaled within the tubular gudgeon 20 extending to the inner surface of the rectangular frame 21 adjacent the gudgeon, and carries a star cam wheel or element 45. The outer end of shaft 44 is keyed to a link 46 which in turn is pivoted to the upstanding post 47 which is pivotally connected at 48 to the base A, as shown in Fig. 2. The cam 45 is preferably provided with four radially extended dwells 50 joined by a concave riding surface 51. At one end of the rectangular framework 21, a vertical slotted guideway 52 is mounted in which a latch element or pawl support 53 is arranged for vertical sliding relation. The pawl carrying element has the pivoted dog or pawl 54 spring pressed in such manner as by spring 49 as to bear substantially tangentially upon the rotatable toothed barrel engaging head 55. The arrangement is such that as the pawl carrier slides downwardly in its guides, the pawl 54 engages behind a tooth 56 of the toothed receptacle support 55 and rotates the receptacle on its longitudinal axis. Movement of the pawl carrying element in the opposite direction, permits the pawl 54 to ride over the next tooth to engage said tooth upon the next succeeding downward stroke. In order to effect successive upward and downward strokes of the pawl carrying element, a lever 57 is pivoted at a desired point 58 to the rectangular frame 21 and has a bearing as by means of a roller 60 upon the concave surface 51 of the cam 45, maintained by resilient means such as a spring 39.

It will be clear that as the rectangular frame 21 is swung on the bearings 15 it will also move relative to the star wheel or cam 45 and thus cause the roller end of the lever 57 to ride up on the dwells and down into a concavity between the dwells, and thus through its pivotal connection 59 with the pawl carrying element 53 cause the latter to slide up and down in its slot and thus progressively advance the barrel or other receptacle on its longitudinal axis.

It will be clear in this connection, that the operating mechanism disclosed, although it is preferred, is subject to considerable modification. It is of importance furthermore, to note that the step by step rotation of the barrel is incidental to, and a result of, the reciprocation of the barrel.

It is contemplated that means may be provided to shift or variably dispose the pivotal connection 58 with relation to the lever 57 and to the rectangular framework 21 in order to vary the extent of movement of the dog or pawl and thus to vary the degree of rotation for each stroke.

In order to frictionally or positively mount the barrel in operative position in the rectangular framework 21 in a manner which will permit of the instantaneous locking or unlocking thereof, it is desirable that although one head or head clamping device, such as one designated as 55 be fixed axially (although suitably journaled for free rotation), the other clamping head 61 may be made adjustable and movable so as to facilitate the insertion and removal of the barrel. This is accomplished in the expeditious manner to be described. As disclosed in Fig. 6, one head clamping element and preferably both thereof, comprises a resilient spider made up of hub 62, spring arms 63, engaging a flanged rim 64 of such size as to accommodate the end of the barrel. The movable head 61 has the hub 62 rigidly mounted upon a spindle or shank 65 rotatably disposed in a cylinder 66, in turn longitudinally slidable in the rectangular frame 21 and guided therein against rotation by a longitudinal rib or key 59. The cylinder 66 carries oppositely disposed ears or lugs 67 threaded into the shank and having a head 69 engaging the upper end of plug 49 in the end of the cylinder. The antifriction bearing 70 permits free rotation of shank 65 relative the cylinder 66. It is to be understood that pressure on the end of shank 65 elevates the head 69 of the bolt from contact with the plug of the cylinder. Rigidly mounted upon the frame 21 are the ears or lugs 71 extending parallel to lugs 67. Toggle links 72 and 73 are journaled on the respective lugs 71 and 67 and are pivotally connected by the stud 74 also extending beyond the toggle links to form a lug in parallelism with lugs 71 affixed to the rectangular frame. Oppositely disposed stop pins 75 project from the rectangular frame 21 in close proximity to, but slightly spaced from, the edges of links 72 and 73 when they are in longitudinal alinement and serve as stops against which the toggle links abut when they are beyond dead center, and in which position they are held through the resilience of the spring arms 63 of the head clamping element.

In order to move the clamping head from and toward its clamping position upon the head of the barrel, a tool is provided having a handle 76 and terminating in a yoke 77 the legs of which are offset at an angle to the line of the handle preferably, as at 78 and in which an elongated slot 80 is arranged to slide over and engage simultaneously lugs 71 and 74 on the respective sides of frame 21. The arrangement of the tool and the toggle link connection is such that pressure on the handle 76, using links 71 as fulcrums, will exert pressure on studs 74 sufficient to move the toggle links away from the stop pins 75 and swing the pivot points of the toggle links substantially to the level of the fulcrum studs, thus moving the clamping head up and away from the head of the barrel or other receptacle. The handle arrangement has a further great utility in that it may remain in position and through its leverage and the weight of the tool being so proportioned as to cause the result, the barrel clamping head will remain in its raised position while the operator is removing the clean barrel and substituting one which is to be cleaned.

In order to reduce and practically to preclude sliding movement of the runners or rockers on their respective rails, a crank lever 81 is preferably provided on each side of the apparatus, the upper end of which is rigidly connected to its appropriate runner or rocker 12 or 13, at a point above its arcuate edge and the free end of which depends to a point slightly below the plane of the rails. Links 82 are pivotally connected to the lower ends of the crank levers 81 and pass through openings in the end plate 10 in which they are resiliently mounted by means of compression springs 83 and 84, the tension of which is controlled by nuts 85 and 86. This assembly reduces vibration, precludes slippage in starting the device and facilitates the smooth and even running of the apparatus.

The natural periodic pendulum action of the apparatus having been determined, such as by the number of oscillations per minute for instance, it remains but to couple the apparatus with power means so geared as to transmit impulses coordinated with the natural periodic movement of the apparatus as to insure a smoothly running, long lived, efficient apparatus for the purpose. To this end connecting rods 87 are connected at appropriate points upon runners 12 and 13 or the side plates 16, which are driven by suitable crank pins 88 mounted on a crank disc 90 driven by a pulley 91 and belting 92 extending to a suitable source of power.

The belting and pulley is preferred although obviously a motor or other power means, may be directly connected to drive the crank disc 90. As the power necessary is slight, in view of the assistance derived from the natural periodic reciprocation of the device, it is perfectly possible to drive the mechanism manually, as for instance by a handle or crank 93.

With the apparatus as described, it is thought that the operation will be clear, as will the fact that many modifications will occur to those skilled in the art which may not have been expressly recited herein, but which are within easy contemplation and are to be construed as within the scope of the following claims.

I claim as my invention:

1. In a receptacle cleaning apparatus, a substantially rectangular frame, means on the frame for supporting a receptacle at the ends thereof, bearings for rotatably mounting the rectangular frame disposed substantially coincident with a diametric transverse axis of said receptacle, means for reciprocating the bearings in an arcuate path longitudinal of the receptacle, a lever operatively connected through one of said bearings with the rectangular frame and a link pivotally connected with said lever at one end, and the other end of said link being relatively fixed whereby reciprocation of the bearings causes oscillation of the rectangular frame therein.

2. In a receptacle cleaning apparatus, a frame, a rotatable clamping head slidable with relation to the frame, toggle links connecting the clamping head and the frame, portable manual means engaging the toggle links for moving the head, and a stop lug mounted in the path of said toggle links to sustain pressure from the toggle links upon their movement beyond dead center, and resilient means for imparting pressure endwise of the toggle links.

3. In a receptacle cleaning apparatus, in combination a base, guiding elements mounted on the base in parallel spaced relation, an oscillatable device comprising side members carrying bearings in axial alinement transversely of the guiding elements, and arcuate rockers mounted on the guiding elements in operative relation to the said elements and carrying said members, a frame journaled in the bearings and adapted to removably receive a receptacle, means for causing reciprocation of the device on the guide elements with a harmonic motion, and means responsive to movement of the device for oscillating the frame in the bearings and thus inclining the receptacle at a predetermined portion of its reciprocating movement.

4. In a receptacle cleaning apparatus, in combination a base, guiding elements mounted on the base in parallel spaced relation, an oscillatable device comprising side members carrying bearings in axial alinement, and arcuate rockers mounted on the guiding elements in operative relation to the said elements and carrying said members, a frame journaled in the bearings and adapted to removably and rotatably receive a receptacle, means for causing reciprocation of the device on the guide elements with a harmonic motion, and additional means responsive to such reciprocation for imparting a progressive step by step rotation to the receptacle in the frame.

5. In a receptacle cleaning apparatus, in combination a base, guiding elements mounted on the base in parallel spaced relation, an oscillatable device comprising side members carrying bearings in axial alinement transversely of the guiding elements, and arcuate rockers mounted on the guiding elements in operative relation to the said elements and carrying said members, a frame journaled in the bearings and adapted to removably receive a receptacle, means for causing reciprocation of the device on the guide elements with a harmonic motion, and supplemental means for varying the relative angular position of the frame and the device regardless of the reciprocation thereof.

6. In a receptacle cleaning apparatus, in combination a base, guiding elements mounted on the base in parallel spaced relation, an oscillatable device comprising side members carrying bearings in axial alinement, and arcuate rockers mounted on the guiding elements in operative relation to the said elements and carrying said members, a frame journaled in the bearings and adapted to removably and rotatably receive a receptacle, means for causing reciprocation of the device on the guide elements with a harmonic motion, means responsive to movement of the device for oscillating the frame in its bearings and thus inclining the receptacle at a predetermined portion of its reciprocating movement, additional means responsive to such reciprocation for imparting a progressive step by step rotation to the receptacle in the frame, and supplemental means for varying the relative angular position of the frame and the device, regardless of the reciprocation thereof.

7. In a receptacle cleaning apparatus, a reciprocating support, a frame journaled on the support on an axis transverse of the path of reciprocation, oppositely disposed rotatable clamping heads mounted on the frame and adapted to removably receive a receptacle between them, a cam rotatably mounted on the frame with its axis concentric with said axis of the frame, means effecting a change of relative position of the cam and frame as the support reciprocates, a pawl and ratchet means operatively connecting the cam and one of said rotatable clamping heads and adapted to rotate said head with a step by step movement as the support reciprocates and responsive to the change of relative position of the cam and frame.

8. In a receptacle cleaning apparatus, a reciprocating support, a pair of rotatable barrel head clamping elements on the support in spaced relation, one element comprising a rotatable shank, a cylinder rotatably receiving the shank and slidable relative to the support, a yoke engaging the cylinder, a lug fixed relatively to the support, a pair of toggle links pivotally engaged together, a lug extending laterally of the toggle links at their pivotal intersection and in alinement with the first mentioned lug, one link pivoted on the first mentioned lug and the other link pivotally connected to said yoke, a portable tool having a slot removably engaging the respective alined lugs and operable to swing the toggle links to open or closed position to vary the respective relation of the two clamping elements.

9. In a receptacle cleaning apparatus, a reciprocating support adapted to receive a barrel with the barrel at a predetermined but variable angle relative to the support in its normal mid-position of rest, and tilting means operatively associated with the barrel and automatically operative to tilt the barrel from its predetermined angular position relative to the support at the extreme ends of the reciprocating stroke of the support, and means for varying the predetermined angular setting of the barrel during the reciprocation of the support.

10. Barrel washing apparatus for barrels having a longitudinal and a central transverse diametrical horizontal axis comprising means for supporting and reciprocating a barrel so that the central transverse diametrical horizontal axis thereof follows an arcuate path substantially tangential to the horizontal, said means having a mid position and two extreme positions and supporting the barrel so that the longitudinal axis thereof is parallel to a tangent of the arcuate path at said mid position, and means operable to swing the barrel on said transverse horizontal axis as it is moved from the mid position to an extreme position to an angular position in which the longitudinal axis of the barrel intersects a plane tangent to the path at the extreme position, said last mentioned means being operatively connected to said first mentioned means whereby it is responsive to and a function of the departure of the first mentioned means from the mid position to an extreme position.

11. Barrel washing apparatus for barrels having a longitudinal and a central transverse diametrical horizontal axis comprising means for reciprocating a barrel so that the central transverse diametrical horizontal axis thereof follows an arcuate path in moving through a mid position to extreme positions, and oscillating means operatively connected to said first mentioned means whereby it is responsive to the reciprocation of the first mentioned means to impart a clockwise oscillation to the barrel about said transverse axis during anti-clockwise movement of said barrel along said arcuate path and to impart anti-clockwise oscillation to said barrel during clockwise movement of said barrel along said path.

12. Barrel washing apparatus for barrels having longitudinal and transverse diametrical axes, comprising means for supporting and reciprocating a barrel so that a transverse substantially diametrical axis thereof follows an arcuate path to which the horizontal is substantially tangential, said means having a mid position and an extreme position and supporting the barrel so that a longitudinal axis thereof is substantially parallel to a tangent of the arcuate path at the mid position, and means operable to swing the barrel on a transverse substantially diametrical axis as it is moved from mid position to the extreme position to an angular position in which the longitudinal axis of the barrel intersects a plane substantially tangential to the said path at the said extreme position in response to and as a function of the departure of the first mentioned means from the mid position to the extreme position.

13. Barrel washing apparatus for barrels having longitudinal and transverse axes comprising means for reciprocating a barrel so that a transverse axis thereof follows an arcuate path in moving through a mid position to extreme positions, and oscillating means operatively connected to said first mentioned means whereby it is responsive to the reciprocation of the first mentioned means to impart a clockwise oscillation to the barrel about a transverse axis during anti-clockwise movement of said barrel along said arcuate path and to impart anti-clockwise oscillation to said barrel during clockwise movement of said barrel along said path.

14. In a drum-cleaning machine, the combination of drum-holding, means for supporting a drum with its longitudinal axis in a generally horizontal position, power-operated oscillating supporting mechanism to which said drum-holding means is pivotally attached on a transverse horizontal axis and by which said axis is caused to move through an upwardly concave curved path, and means, connected with said drum-holding means, for tilting the same upon said transverse axis, during each oscillation, in a direction to depress the advancing end of the drum, and means for automatically rotating the drum about said longitudinal axis during and in response to reciprocations of said first mentioned means.

15. In a drum-cleaning machine, the combination of drum-holding means for supporting a drum with its longitudinal axis in a generally horizontal position, power-operated oscillating supporting mechanism to which said drum-holding means is pivotally attached on a transverse horizontal axis and by which said axis is caused to move through an upwardly concave curved path, and means connected with said drum-holding means, for tilting the same upon said transverse axis, during each oscillation, in a direction to depress the advancing end of the drum.

JOHN E. WILKES.